United States Patent Office 3,399,835
Patented Sept. 3, 1968

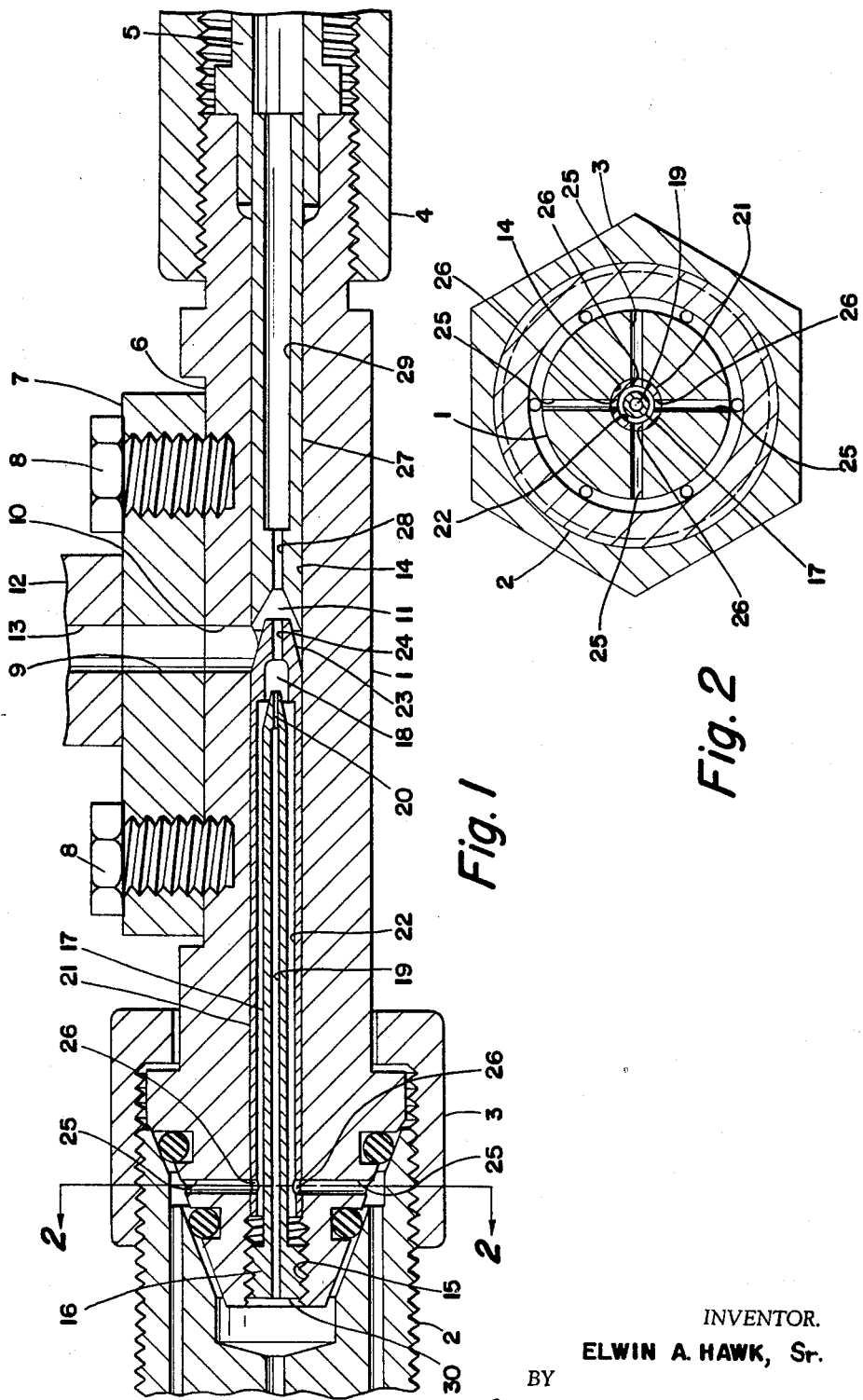

3,399,835
POWDER SPRAY TORCH
Elwin A. Hawk, Sr., East Rochester, Ohio, assignor to Coast Metals, Inc., Little Ferry, N.J., a corporation of Delaware
Filed July 29, 1966, Ser. No. 568,884
4 Claims. (Cl. 239—85)

ABSTRACT OF THE DISCLOSURE

The invention relates to a powder spray torch of the type in which powder is dropped into a powder chamber and is aspirated to the torch tip or nozzle by a combustible mixture of oxygen and acetylene, but is concerned primarily with the provision of means for adjusting or varying the area or point in the torch system at which a completely combustible mixture of the oxygen and acetylene is formed, to thereby greatly reduce or eliminate any possibility of flashback, and for enabling the torch to be operated at a higher than conventional ratio of oxygen pressure and velocity to acetylene pressure and velocity, so that a greater vacuum can be maintained for aspirating the powder, thereby increasing the capacity of the torch for depositing powder.

---

This invention relates generally to powder spray torches, but has reference more particularly to improvements in the type of torch disclosed, for example, in the Schilling et al. Patent 3,226,028 and the Cape Patent 3,194,501.

In the Schilling Patent No. 3,226,028, a torch is disclosed for spraying powder, in which oxygen and acetylene are supplied through separate parallel passageways, with the acetylene joining the oxygen in a mixing chamber which is disposed forwardly of the space into which the powder is aspirated by the stream of oxygen. The pressure of the oxygen is much greater than the pressure of the acetylene, and this is presumed to prevent the acetylene from flowing backwardly into the powder supplying passageway from the mixing chamber, thereby preventing flashback.

The aforesaid system has a marked disadvantage in that when the acetylene is turned on first, there is no vacuum and therefore the entire torch is filled with acetylene. When the oxygen is turned on, the vacuum caused by the oxygen removes the acetylene. This delay in turning on the oxygen, however, provides a period or interval in which the acetylene can accumulate in some portion of the system, which acetylene could be ignited accidentally and cause an explosion.

In the torch disclosed in the Cape Patent 3,194,501, the oxygen and acetylene, each under the same pressure and velocity, i.e., at a 1:1 ratio, are discharged into an elongated tubular member wherein the oxygen and acetylene form a combustible mixture, which is discharged through an aspirator nozzle into a chamber, wherein the mixture picks up powder and carries it to a powder melting flame. In such a torch, the aspirating effect is limited to the 15 p.s.i. allowable acetylene pressure, and the operating ratio, that is, the ratio of the oxygen pressure and velocity to that of the acetylene is 1:1, so that the capacity of the torch for carrying and melting powder is somewhat limited, as is the ability of the torch to resist flashback.

The present invention has, as its principal object, the provision of a torch of the character described, in which a vacuum, for the purpose of aspirating the powder, may be produced by either the oxygen or the acetylene, or a mixture of these gases.

Another object of the invention is to provide a torch of the character described, which may be operated at a 2:1 ratio, or at a higher ratio, so that a greater vacuum can be maintained for aspirating the powder, thereby increasing the capacity of the torch for depositing powder.

A further object of the invention is to provide a torch of the character described, in which the area or point in the torch system at which a completely combustible mixture of the oxygen and acetylene is formed may be adjusted or varied, to thereby greatly reduce or eliminate any possibility of flashback.

Other objects and advantages of my invention will be apparent during the course of the following description.

In the accompanying drawing forming a part of this specification, and in which like numerals are employed to designate like parts throughout the same, FIG. 1 is a fragmentary enlarged longitudinal cross-sectional view of a torch embodying the novel features of the invention, and FIG. 2 is a transverse cross-sectional view, taken on the line 2—2 of FIG. 1.

Referring more particularly to the drawings, reference numerical 1 designates a mixer body which is removably secured to a body head 2, as by means of a nut 3. The head, 2, is, in turn, secured to a torch body or butt (not shown), provided at its rear end with valves for controlling the supply or flow of oxygen and acetylene to the mixer body.

The mixer body 1 has removably secured to its forward end, as by means of a nut 4, a tip or nozzle 5.

The mixer body 1 is provided with a flat surface 6, to which a base plate 7 is secured, as by bolts 8. The base plate is provided with a vertical opening 9, which communicates, ot its lower end, with an opening 10 in the mixer body through which powder is dropped into the powder chamber 11 of the mixer body.

The base plate has brazed to its upper surface a tube 12, which is provided at its lower end with a bore 13 which is in axial alignment with the openings 9 and 10. Powder is supplied from a hopper (not shown) to the bore 13, in the manner described in Cape Patent 3,194,501, to which reference may be had for further details of the powder flow control.

The mixer body 1, is provided with an axial bore 14 which extends entirely through the mixer body and intersects the opening 10 in the body. The rear end of this axial bore is threaded, as at 15, for the reception of the head 16 of a quill 17 which extends forwardly to a mixing chamber 18. The quill 17 has an axial passageway 19, which communicates at its forward end with an orifice 20, which is approximately .025" in diameter.

Disposed within the bore 14 of the mixer body is a tubular member 21, the inner wall 22 of which is an spaced concentric relation to the outer wall of the quill 17. The tubular member 21 is provided at its forward end with an aspirator tip 23 which is disposed below the opening 10 and has an orifice 24, which is spaced axially from the orifice 20.

The mixer body 1 is provided in its rear portion with four circumferentially spaced, radially extending passageways 25 which communicate at their inner ends with correspondingly spaced radial openings 26 in the tubular member 21. Acetylene passes through the passageways 25 and openings 26 and through the space between the quill 17 and tubular member 21, and thence into the mixing chamber 18. Oxygen is passed through the passageway 19 in the quill 17 and through the orifice 20 into the mixing chamber 18. The mixture of acetylene and oxygen passes through the orifice 24 of the aspirator tip 23 into the powder chamber 11, where the mixture picks up the powder and carries it through a tubular member 27 which is disposed within the forward portion of the bore 14 of the mixer body 1, and thence through the nozzle or tip 5 of the torch. The tubular member 27 has a narrow passageway 28 into which the powder-laden combustible mixture of gases is discharged, this passageway communicating with an enlarged passageway 29, which, in turn, communicates with the nozzle 5.

The head 16 of the quill 17 is provided at its rear end with a slot 30 adapted to receive a screwdriver, whereby the axial position of the quill 17 with respect to the mixer body 1 may be adjusted, to thereby adjust the length or cubical volume of the mixing chamber 18.

I have found, as the result of a series of tests, that by adjusting the length or cubical volume of the mixing chamber 18, the position or point in the torch system where the oxygen and acetylene are mixed for complete combustion may be varied. If this position for complete combustion is located at the wrong place in the system, flashback becomes prevalent. If, however, this position is adjusted to an advantageous position, it becomes virtually impossible to produce flashback in the torch.

The position for complete combustion is not a fixed position, but depends upon variations in the operating pressures of the oxygen and acetylene, and upon variations in the sizes of the nozzle or tip 5. This makes it necessary to adjust the position of the quill in accordance with the operating pressures of the gases and the tip or nozzle sizes, but in any event, it is desirable to maintain the position for complete combustion at a very narrow passageway, where the velocity of the gases is high, in order to prevent flashback. It is advantageous, therefore, that the mixing chamber 18, in which the oxygen and acetylene are combined, have a relatively long discharge opening 24.

In a practical embodiment of the torch shown in the drawings, the openings 25 and 26 were .029" in diameter, and the oxygen passageway 19 in the quill was .052" in diameter. The orifice 20 was 0.025" in diameter. The diameter of the wall 22 was 0.113", and the external diameter of the quill 17 was 0.101, leaving a clearance therebetween of 0.012" for the passage of the acetylene. The mixing chamber 18 was 0.086" in diameter. The orifice 24 was 0.070" in diameter, and the passageway 29 was 0.076" in diameter.

With the aforesaid dimensions, the torch worked very satisfactorily with a tip orifice ranging between .082 and .076, delivering 10 pounds of 150 mesh powder per hour with a .082" tip. These dimensions can, of course, be changed proportionately, depending upon the size and requirements of the torch.

With the mixer operated at a 2:1 ratio, the capacity of the torch for carrying powder was greatly increased, as was the capacity of the torch for depositing powder.

Since the oxygen passageway and orifice are behind the point at which the acetylene enters the mixing chamber, the oxygen orifice can be adjusted to bring it closer to or farther from the mixing chamber or combustion stage, which is equivalent to changing the area or cubical volume of the mixing chamber. This, as previously explained, permits adjustment of the area or point in the torch system, at which a completely combustible mixture of the oxygen and acetylene is formed, and thereby greatly reduces or eliminates any possibility of a flashback.

It is to be understood that the form of my invention, herewith shown and described, is to be taken as a preferred example of the same, and that various changes may be made in the shape, size and arrangement of parts thereof, without departing from the spirit of the invention or the scope of the subjoined claims.

Having thus described my invention, I claim:

1. In a powder spray torch of the character described, a mixer body having a longitudinal bore, and a powder supply opening communicating with said bore at a point intermediate the ends of said bore, a tubular member disposed in said bore and having an aspirator tip adjacent said point in said bore, said tip having a passageway therethrough for the passage of a combustible mixture of oxygen and acetylene, said tubular member having a mixing chamber therein rearwardly of said passageway, a second tubular member disposed within said first tubular member and providing therebetween an annular passageway for the passage of acetylene to said mixing chamber, said second tubular member having a nozzle portion extending into said mixing chamber and provided with an orifice which conducts oxygen therethrough to said mixing chamber, said second tubular member being adjustable axially relatively to said first tubular member, whereby the degree of extension of its nozzle portion into the mixing chamber may be varied, to thereby vary the effective length of said mixing chamber.

2. A powder spray torch, as defined in claim 1, including means for adjusting said second tubular member axially with respect to said first tubular member.

3. A powder spray torch, as defined in claim 1, wherein said second tubular member has a head provided with a slot in its end, whereby said second tubular member may be adjusted relatively to said first tubular member.

4. In a powder spray torch of the character described, a mixer body having a longitudinal bore and a powder supply opening communicating with said bore, a tubular member disposed in said bore and having an aspirator tip adjacent said powder supply opening, said tip having a passageway therethrough for a combustible mixture of oxygen and a fuel gas, said tubular member having a mixing chamber rearwardly of said tip passageway and of larger cross-sectional area than said tip passageway, a second tubular member disposed within and threadedly secured to said mixer body and having an external surface spaced from the internal surface of said first tubular member to provide an annular passageway for the passage of fuel gas to said mixing chamber, said second tubular member having a nozzle portion extending into the rear of said mixing chamber and provided with an orifice which conducts oxygen passing through said second tubular member to said mixing chamber, said threaded connection permitting axial adjustment of the second tubular member relatively to said first tubular member.

References Cited

UNITED STATES PATENTS 2,861,900   11/1958   Smith et al. _____ 239—79 X

ALLEN N. KNOWLES, *Primary Examiner.*